Nov. 7, 1933.    J. FISCHER    1,934,595
THERMAL METER
Filed Dec. 5, 1931
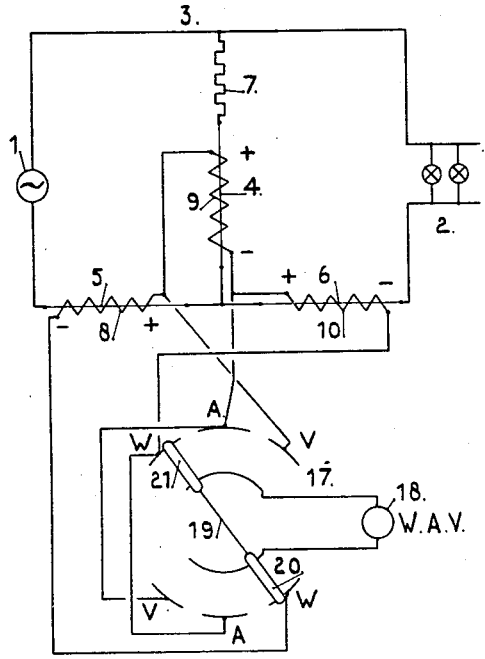
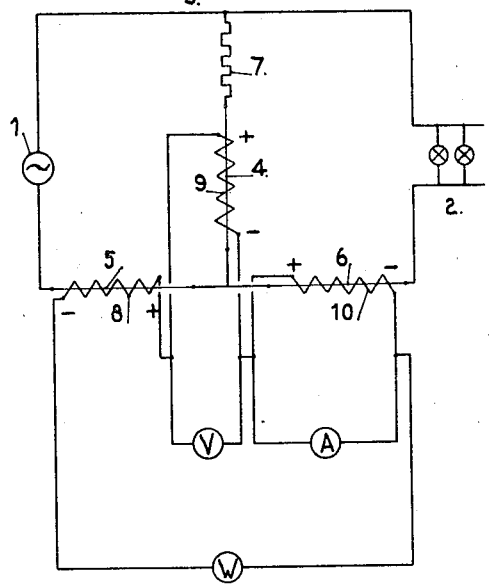
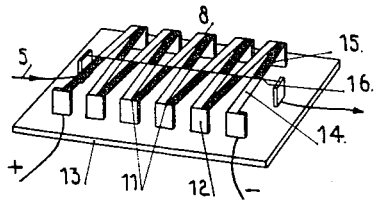
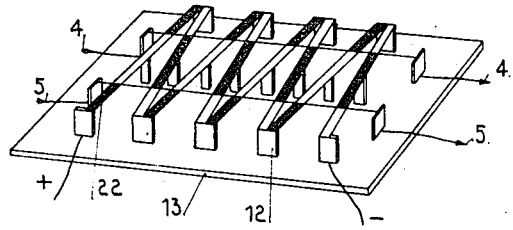
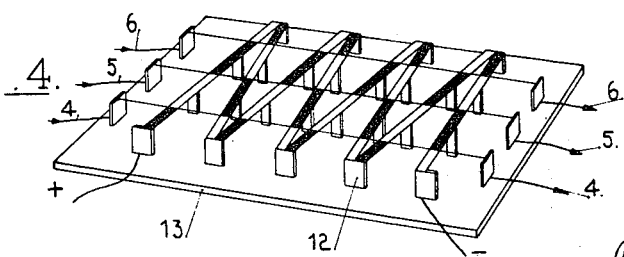
Inventor
Johannes Fischer
By B. Singer, atty.

Patented Nov. 7, 1933

1,934,595

UNITED STATES PATENT OFFICE 1,934,595

THERMAL METER

Johannes Fischer, Karlsruhe, Germany, assignor to N. V. Instrumentfabriek en-Handel voorheen, P. J. Kipp en Zonen, Delft, Netherlands, a limited company of the Netherlands Application December 5, 1931, Serial No. 579,252, and in Germany December 11, 1930

8 Claims. (Cl. 171—270)

This invention relates to improvements in thermal meters especially for use for measuring products of electrical quantities of the type which works according to the formula $$N = EI = \tfrac{1}{2}\,[(E+I)^2 - E^2 - I^2]$$

the product of the two quantities E and I being obtained by mutually subtracting the responses of devices, each of which gives a response proportional to the square of one of the quantities, that is to say, of the sum or difference of two quantities, and which devices are thermal measuring devices, the heating circuits and the measuring circuits of which are so connected that the desired product is obtained in the measuring circuit.

The invention also comprises means to measure the single quantities with an instrument of the type described.

An object of the invention is to provide as a step in the manufacture of these instruments, an improved method for effecting adjustment of the responses of the individual thermal elements in such manner that the undesired components of the electro-motoric forces developed in these elements correctly balance out when such elements are connected together in opposition.

Another object of the invention is to effect simplified embodiments of the main inventive idea, which are obtained by suitably combining different thermal elements, which are to be connected in opposition, into a single thermal-electric measuring device having a plurality of heating wires.

With the above and other objects in view, the invention consists in the construction, combination, and arrangement of devices hereinafter described and claimed.

In the drawing

Figure 1 is a diagram showing the connections of an instrument of the type described for alternatively measuring the voltage, current strength and wattage supplied by a generator.

Figure 2 is a perspective view of a thermal-electric measuring device as used in the instrument represented diagrammatically in Figure 1.

Figure 3 is a perspective of a double thermal measuring device, which gives the subtracted effect of two of the devices of Figure 2.

Figure 4 is a perspective of a triple thermal measuring device giving a product of subtraction or addition of three thermal measuring devices according to Figure 2, combined into one.

Figure 5 is a diagram of the connections of an instrument for simultaneously measuring the voltage, current strength and wattage supplied by a generator to a load.

Referring to the diagram, Figure 1, 1 is a generator supplying current to a load consisting for example of lamps 2. Between the generator 1 and the load 2 a measuring instrument 3 according to the invention is connected. The instrument comprises three heating wires 4, 5 and 6, connected as shown, the wires 5 and 6 being connected in series to form part of one of the conductors between the generator and the load, and the wire 4 being connected between the junction point of the wires 5 and 6 and one extremity of a resistance 7, the other extremity of which is connected to the other supply conductor. With these connections the current I flows in the heating wire 6, a current $kE$ flows in the wire 4; $k$ being a constant and the sum of these currents $(kE+I)$ flows in the heating wire 5.

Each heating wire acts on the hot junctions of thermal measuring circuits 8, 9 and 10. Each thermal measuring circuit with its heating wire constitutes a thermal measuring device, one of these being represented in the perspective, Figure 2. The thermal electric junctions are constituted between successive alternate strips 14, 15 of two different suitable metals, for example alloys called constantan and manganin.

Each pair of strips 14, 15 contains a hot junction 16; the extremities 11 of each pair of strips are soldered to uprights 12 which are soldered to the base 13. The extremities of successive pairs 11 soldered to these uprights constitute the cold junctions.

The extremities of the measuring conductor 8 constituted by the successive thermal strips connected in series are connected, according to Figure 1, with the corresponding extremities of measuring conductors of other thermal measuring devices and a switch 17, to an indicating instrument 18, such as a millivoltmeter. With the switch arm 19 in the position shown (position 20), a circuit is formed from one pole of the instrument 18, through conducting piece 20 of switch arm 19, through 8, 9 and 10 in series, conducting piece 21 of switch arm 19 to the other pole of the instrument. In this measuring circuit the electromotive forces developed in measuring conductors 8, 9 and 10, act jointly, these conductors being joined up with such polarity that the electromotive forces developed in 9 and 10 are subtracted from the electromotive force developed in 8, the result being applied to the instrument 18. This result is $c(kE+I)^2 - c(kE)^2 - cI^2 = 2ckEI = $ const. $EI$, the thermal electric effects in each of the measuring conductors being proportional to the square of the current in the corresponding heating wire, the factor of proportionality being $c$.

Similarly with the switch arm 19 in the position A, a measuring circuit will be formed from one pole of the instrument 18, through conducting piece 20 of switch arm 19, through 6, conducting piece 21 of switch arm 19 back to the other pole of instrument 18. In this measuring circuit the electromotive force developed in 10 acts on the measuring instrument; this electromotive force being proportional to the square of the current, the measuring instrument indicates the current strength supplied by the generator 1.

Finally if the switch arm is on the contact V the measuring instrument 18 will give a deviation proportional to the electromotive force developed in 9. This electromotive force being proportional to the square of the voltage, the instrument 18 will now indicate the voltage.

As shown in Figure 3, a double thermal measuring device having two heating wires may be used instead of two separate thermal measuring devices each with a single heating wire. In this instance it has been assumed that the devices 5, 8 and 4, 9 of Figure 1 have been combined into a single instrument. In the actual instrument the wires 4 and 5 have of course to be connected up to the other apparatus in a manner corresponding to Figure 1. The measuring conductors 8 and 9 have been combined into a single measuring conductor 22 comprising alternate thermal electric strips in series, these series strips giving a total effect of the same nature as would be obtained by connecting in series the measuring conductors 8 and 9 of two separate thermal measuring devices, as supposed in the above description. To this end the polarities of successive hot junctions heated by the two wires 4 and 5 is chosen, so that the thermal electric forces developed in these hot junctions are subtracted from each other. This is effected in a simple way as shown in the drawing by choosing the center portion of each strip from one of the metals constituting the thermal junctions and the end parts from the other metal.

A further simplification of the connections is obtained as shown in Figure 4 by combining the three thermal measuring devices into a triple thermal measuring device, having three heating wires 5, 4 and 6. In order to effect the subtraction of the thermal effects induced by the heating wires 4 and 6 from that induced by the heating wire 5 each thermal electric strip lying over the three heating wires is built up from sections of the constituent metals of the thermal junction in the manner indicated in the figure, thereby forming three hot junctions in each strip, two of which, lying on heating wires 4 and 6, giving electromotive forces in one direction, while the thermal electric force induced by heating wire 5 in the third hot junction is in the opposite direction.

An instrument having three indicating meters V, A, and W for simultaneously indicating a voltage, current strength and watts respectively is shown diagrammatically in Figure 5, which corresponds to Figure 1 excepting in the connections of the thermal measuring conductors 8, 9 and 10. As shown in Figure 5 the thermal measuring conductors 9 and 10 are each connected to an instrument, V and A respectively showing volts and amps., the three measuring conductors 8, 9 and 10 being connected in series in the circuit of the wattmeter W, in such a manner, that the thermal electric forces developed in the conductors 9 and 10 are in opposition to that developed in conductor 8. Switching means for connecting or disconnecting each indicating instrument from the thermal electric sources may be provided if desired.

The invention is not limited to the examples shown and described in the present specification, but what I claim is:

1. An instrument for measuring products of electrical quantities, having three circuits joined in one point, in one of which circuits flows a current representing one of the said electrical quantities, in a second of which circuits flows a current representing another such quantity, and in the third a current representing a function of addition of the said quantities, said last circuit and at least one of the other circuits containing heating wires with thermal measuring devices, the sensitive parts of which are so arranged that their effects are subtracted from each other.

2. An instrument for measuring products of electrical quantities, having three circuits joined in one point, in one of which circuits flows a current representing one of the said electrical quantities, in a second of which circuits flows a current representing another such quantity, and in the third a current representing a function of addition of the said quantities, all three circuits containing heating wires with $n$ thermo-junctions, $n$ being a whole number, the effect of the junctions heated by the currents in the first mentioned two circuits being subtracted from that of the junction corresponding to the last mentioned circuit.

3. An instrument for measuring products of electrical quantities, having three circuits joined in one point, in one of which circuits flows a current representing one of the said electrical quantities, whereas in a second circuit flows a current representing another such quantity, and in the third a current representing a function of addition of the said quantities, all three circuits containing heating wires with $n$ thermo-junctions, $n$ being a whole number, the effect of the junctions heated by the currents in the first mentioned two circuits, being subtracted from that of the junction corresponding to the last mentioned circuit, inherent errors being compensated by a change of the response of the thermo-junctions.

4. An instrument for measuring products of electrical quantities, having three circuits joined in one point, in one of which circuits flows a current representing one of the said electrical quantities, whereas in a second circuit flows a current representing another such quantity and in the third a current representing a function of addition of the said quantities, this last circuit and at least one of the other circuits containing heating wires with $n$ thermal measuring devices, $n$ being a whole number, the sensitive parts of which are so arranged that their effects are subtracted from each other, an even number of thermal elements being combined into a thermo-electric measuring device having an even number of junctions so that the difference between two of the quantities to be measured is obtained by a single measuring device.

5. An instrument for measuring products of electrical quantities, having three circuits joined in one point, in one of which circuits flows a current representing one of the said electrical quantities, whereas in a second circuit flows a current representing another such quantity, and in the third a current representing a function of addition of the said quantities, all three circuits containing heating wires with $n$ thermo-junctions, $n$ being a whole number, the junctions forming a single unit with an uneven number of junctions, these being so joined that the effect of the junctions heated by the currents in the first mentioned two circuits is subtracted from that of the junction corresponding to the last mentioned circuit.

6. An instrument for measuring electrical quantities, as well as a product of these quantities, having three circuits joined in one point, in one of which circuits flows a current representing one of the said electrical quantities, whereas in a second circuit flows a current representing another such quantity and in the third a current representing a function of addition of the said quantities, this last circuit and at least one of the other circuits containing heating wires with $n$ thermal measuring devices $n$ being a whole number, the sensitive parts of which are so arranged that their effects are subtracted from each other, the result representing the required product, the quantities themselves being represented by the responses of the individual thermal measuring devices.

7. An instrument for measuring electrical quantities, as well as a product of these quantities, having three circuits joined in one point, a first thermo-junction, heated by a heating wire in one of these circuits, this junction indicating in a direct current measuring instrument one of the said electrical quantities, whereas the current in a second circuit heats a second set of $n$ thermo-junctions which may alternatively indicate in the said direct current measuring instrument another such quantity, and the current in the third circuit which represents a function of addition of the said quantities, heats a third set of $p$ thermo-junctions which alternatively indicate in conjunction with the two first mentioned sets of junctions in the said direct current measuring instrument the product of the said quantities, and switching means for alternatively connecting the said junctions in the correct manner to the said instrument.

8. An instrument for measuring electrical quantities, as well as a product of these quantities, having three circuits joined in one point, a first set of $n$ thermo-junctions, heated by a heating wire in one of these circuits, these junctions indicating in a first direct current measuring instrument one of the said electrical quantities, whereas the current in a second circuit heats a second set of $m$ thermo-junctions which indicate in a second direct current measuring instrument another such quantity, the current in the third circuit which represents a function of addition of the said quantities heating a third set of $p$ thermo-junctions which indicate in conjunction with the two first mentioned junctions in a third direct current measuring instrument the product of the said quantities.

JOHANNES FISCHER.